(12) United States Patent
Ochiai et al.

(10) Patent No.: US 6,974,151 B2
(45) Date of Patent: Dec. 13, 2005

(54) PASSENGER PROTECTING APPARATUS

(75) Inventors: Fumiharu Ochiai, Wako (JP); Koji Ikeda, Wako (JP); Fumitoshi Yasuhara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/648,095

(22) Filed: Aug. 26, 2003

(65) Prior Publication Data

US 2004/0046366 A1 Mar. 11, 2004

(30) Foreign Application Priority Data

Sep. 9, 2002 (JP) .............................. 2002-262437

(51) Int. Cl.[7] .......................... B60R 21/16; B60R 21/22
(52) U.S. Cl. .............................. 280/728.2; 280/730.2; 280/749
(58) Field of Search .............................. 280/728.2, 749, 280/730.2

(56) References Cited

U.S. PATENT DOCUMENTS

| | | | | |
|---|---|---|---|---|
| 6,224,087 B1 * | 5/2001 | Stutz et al. | ............... | 280/728.2 |
| 6,234,517 B1 * | 5/2001 | Miyahara et al. | ........ | 280/730.2 |
| 6,279,941 B1 * | 8/2001 | Nakajima et al. | ........ | 280/728.2 |
| 6,325,410 B1 * | 12/2001 | Eyrainer | .................. | 280/730.2 |
| 6,447,005 B2 * | 9/2002 | Alb et al. | ................ | 280/730.2 |
| 6,616,175 B2 * | 9/2003 | Hofmann et al. | ........ | 280/730.2 |
| 6,705,636 B2 * | 3/2004 | Takahara | ................. | 280/728.2 |
| 6,719,321 B2 * | 4/2004 | Yasuhara et al. | ........ | 280/730.2 |
| 6,793,241 B2 * | 9/2004 | Wallner et al. | .......... | 280/730.2 |
| 6,796,576 B2 * | 9/2004 | Aoki et al. | .............. | 280/730.2 |
| 2003/0094797 A1 * | 5/2003 | Sonnenberg | ............. | 280/730.2 |

FOREIGN PATENT DOCUMENTS

| | | |
|---|---|---|
| JP | 09-240409 | 9/1997 |
| JP | 11-129857 | 5/1999 |
| JP | 2003-200812 | 7/2003 |
| JP | 2003-285708 | 10/2003 |

\* cited by examiner

*Primary Examiner*—Eric Culbreth
(74) *Attorney, Agent, or Firm*—Hamre, Schumann, Mueller & Larson, P.C.

(57) ABSTRACT

A passenger protecting apparatus is composed so that an airbag is provided above a door opening of a vehicle body in a folded situation, is inflated and unfurled downward in gas inflow, is fixed to said vehicle body by a fitting through a bracket and the bracket positions a through-hole, through which the fitting to fix the bracket to the vehicle body is inserted, below the airbag attached to and housed in the vehicle body.

5 Claims, 5 Drawing Sheets

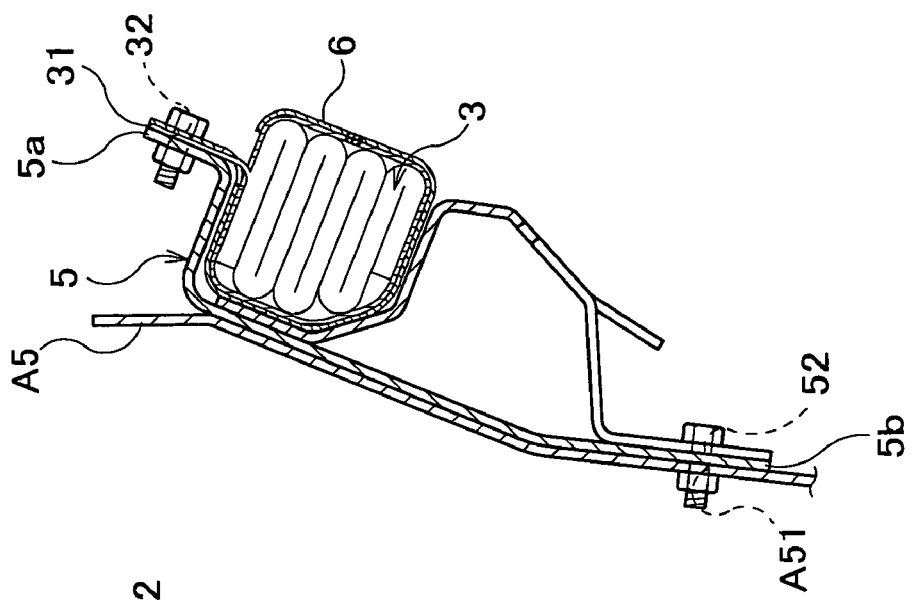
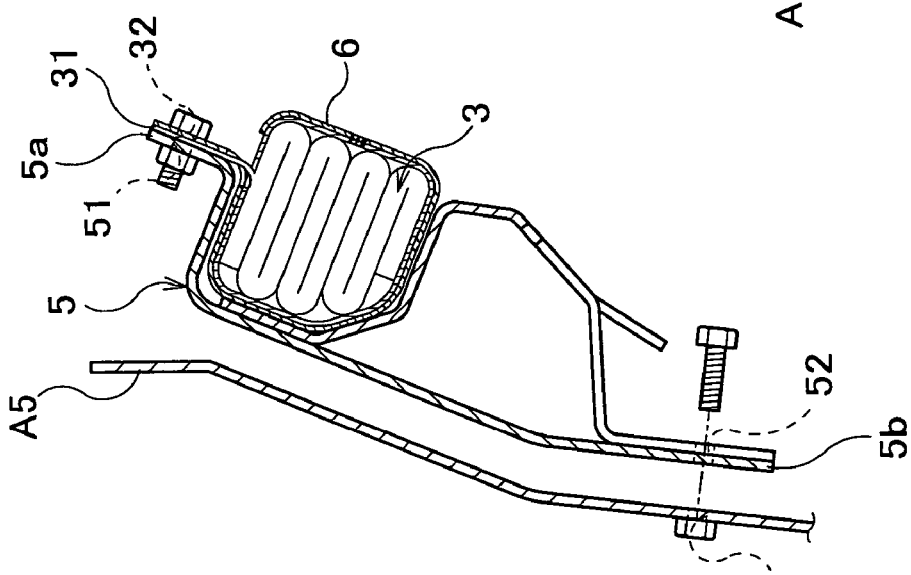
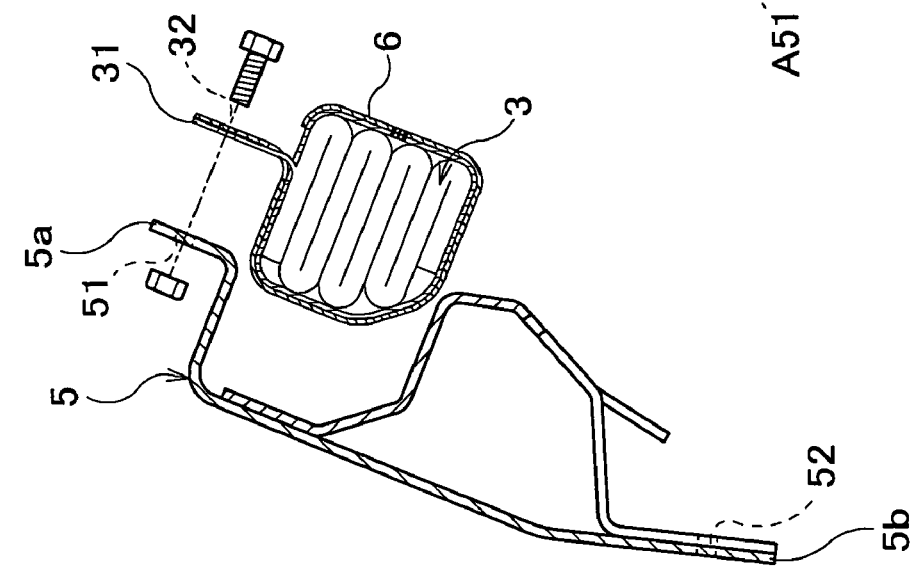

PASSENGER PROTECTING APPARATUS

FIELD OF THE INVENTION

The present invention relates to a passenger protecting apparatus which inflates and unfurls an airbag like a curtain along side window glasses in a passenger compartment if a vehicle side collision and roll over are detected or foreseen.

BACKGROUND OF THE INVENTION

Conventionally, a passenger protecting apparatus is devised, wherein if a vehicle side collision and roll over are detected or foreseen, an airbag housed as folded at an upper portion of a vehicle door opening, for example, in a roof side rail is inflated/unfurled, thereby absorbing and buffering an impact strength added to a passenger's head according to a cushion effect of the airbag in the case of a vehicle side collision and roll over, thus protecting the passenger's head.

A conventional passenger protecting apparatus houses an airbag as folded in a roof side rail to absorb/buffer an impact strength added to a passenger's head, and in the case of detecting a side collision with another vehicle and the like by a detector, the folded airbag is filled in with gas by an inflator and inflated/unfurled along side window glasses in a passenger compartment like a curtain, thereby supporting the passenger's head with the inflated/unfurled airbag, wherein in the case of the vehicle side collision and roll over an impact strength added to the passenger's head is intended to be absorbed and buffered (refer to Japan patent publication 2920291).

The conventional passenger protecting apparatus is structured so as to protrusively form attachment pieces like a tongue at an upper brim of the airbag and to fasten it in a folded situation to a body by a fitting such as a bolt through holes drilled in each attachment piece.

However, this structure causes a dropped bolt from a fastening position to enter in a gap in some occasions when fastening the airbag to a vehicle body because a Through-hole through which a bolt fastens the airbag to the body is positioned above the folded air bag.

In this occasion, it takes labor hours and time to take out the dropped bolt from the gap between the airbag and body and to attaching it, respectively. Moreover, because a work position becomes high for a worker who attaches the airbag in the vehicle compartment and an elevation angle becomes larger, accordingly, a worker's burden becomes larger.

Therefore, the conventional passenger protecting apparatus has a problem that it takes labor hours to attach the airbag to the vehicle body, and thereby the airbag cannot be efficiently attached to the body.

SUMMARY OF THE INVENTION

An exemplary object of the invention is to provide a passenger protecting apparatus which can improve a work efficiency in attaching an airbag to a vehicle body.

A passenger protecting apparatus of the invention, in which an airbag is provided above a door opening of a vehicle in a folded situation and in gas inflow the airbag is inflated and unfurled downward, is characterized in that the airbag is composed so as to be fastened to a vehicle by a fitting such as a bolt/nut or rivet through a bracket, and the bracket is composed so that a through-hole, through which the fitting to fasten the bracket to the vehicle is inserted, is positioned below the airbag attached to and housed in the vehicle.

The apparatus is designed so that the airbag to absorb and buffer an impact force added to a passenger is attached by being fastened/fixed to the vehicle with a fitting such as a bolt through a bracket and the bracket positions a through-hole, through which the fitting to fasten the bracket to the vehicle is inserted, below the airbag attached to and housed in the vehicle.

According to the structure, because a fastening position of the airbag to the vehicle body is positioned below the airbag housed in the vehicle in the folded situation, a bolt dropped from the fastening position can be avoided from entering in a gap between the airbag and body when fastening the airbag to the body using a fitting such as a bolt, and thereby it can be made to prevent long time in a series of work to attach/fasten the airbag to the body from being needed.

Moreover, the fastening position of the airbag to the vehicle body can make a work position for a worker fastening the airbag in the vehicle compartment lower, so an elevation angle in fastening the airbag with a bolt can be smaller, and thereby a worker's burden can be reduced. Therefore, the passenger protecting apparatus enables an efficiency of the attaching work to the vehicle body to be improved.

BRIEF DESCRIPTION OF THE DRAWINGS

FIGS. 4A, 4B, and 4C are drawings illustrating attaching procedures of the airbag to a vehicle.

DESCRIPTION OF THE PREFERRED EMBODIMENTS

Figure 1:
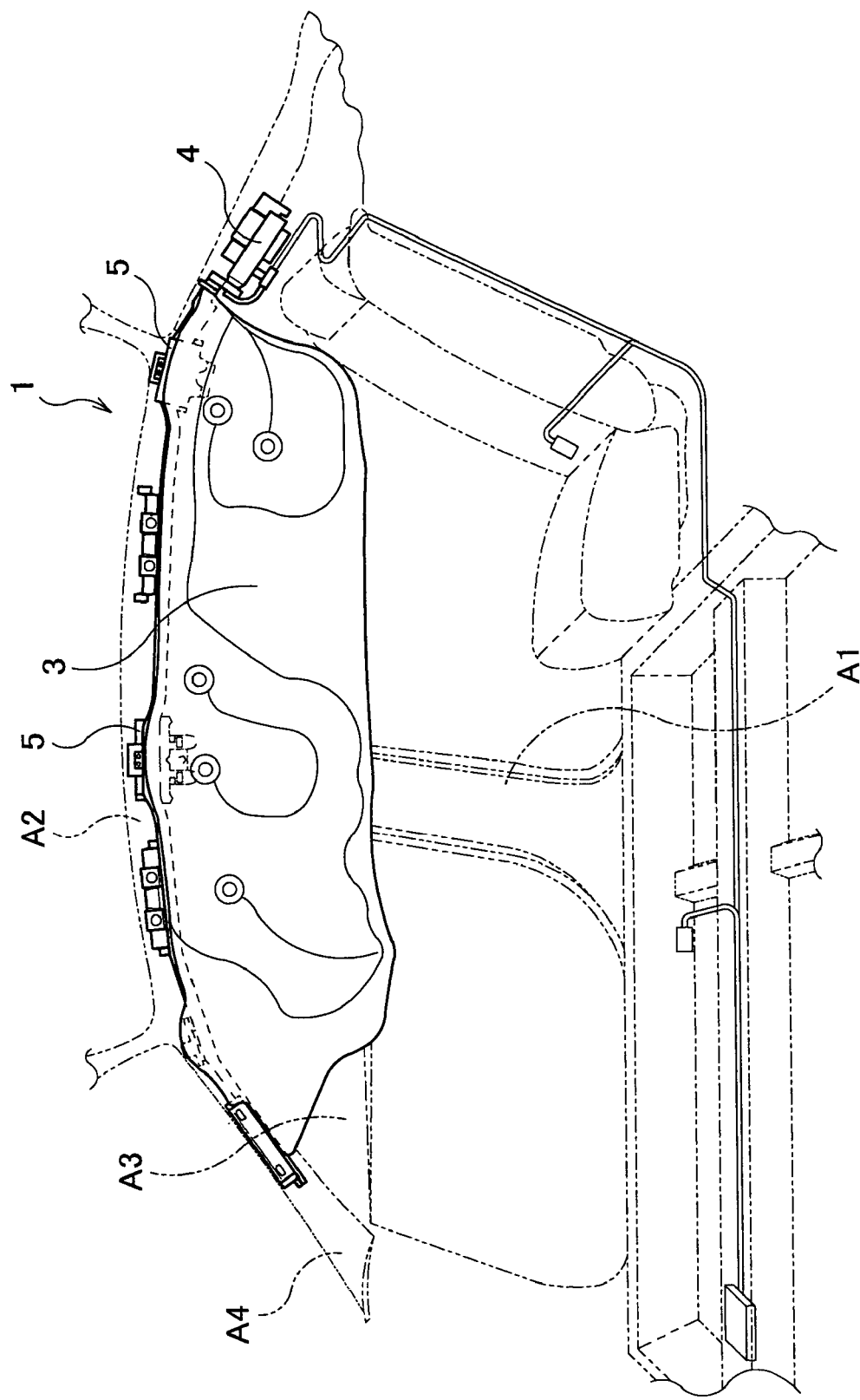
FIG. 1 is a drawing schematically illustrating a vehicle equipped with a passenger protecting apparatus related to one of embodiments of the invention.

One of embodiments of the invention is described hereinafter referring to the drawings. In the referred drawings, FIG. 1 is a drawing schematically illustrating a vehicle provided with a passenger protecting apparatus 1 related to one of embodiments of the invention.

As shown in FIG. 1, the passenger protecting apparatus 1 is equipped with a collision detecting sensor not shown in the drawing to detect a vehicle side collision and roll over, an airbag 3 to protect a passenger from a impact force added in a side collision, and an inflator to fill in gas.

The inflator 4 is provided at a vicinity of back end of a roof side rail and a gas generating agent is filled inside it. If the collision detecting sensor detects a collision, the inflator 4 is designed so that an igniting current is supplied, the gas generating agent filled inside is ignited, and the inflator 4 generates gas, thereby filling the generated gas in the airbag 3.

Figure 2:
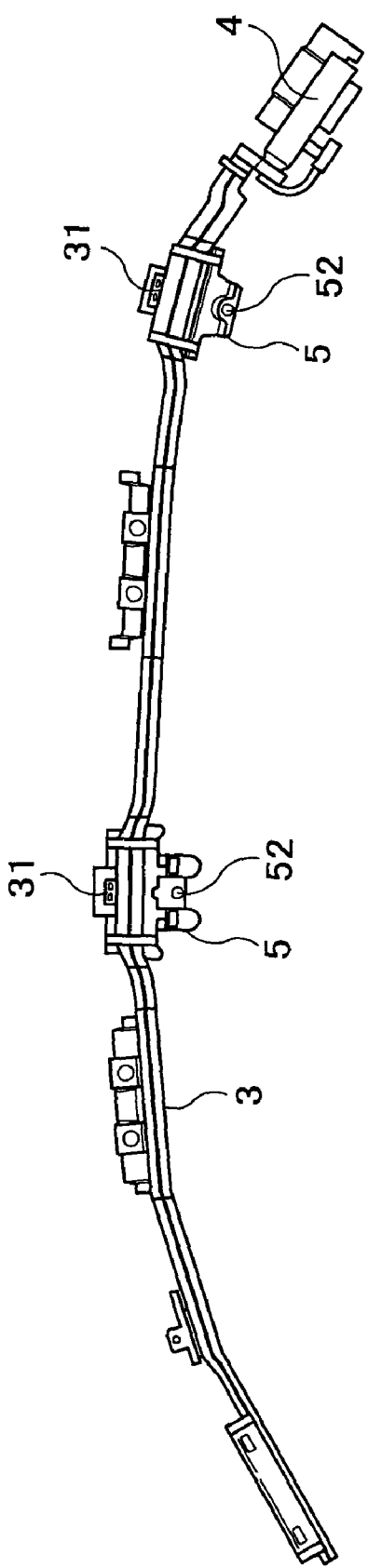
FIG. 2 is a drawing illustrating an airbag composing the passenger protecting apparatus.
Figure 3:
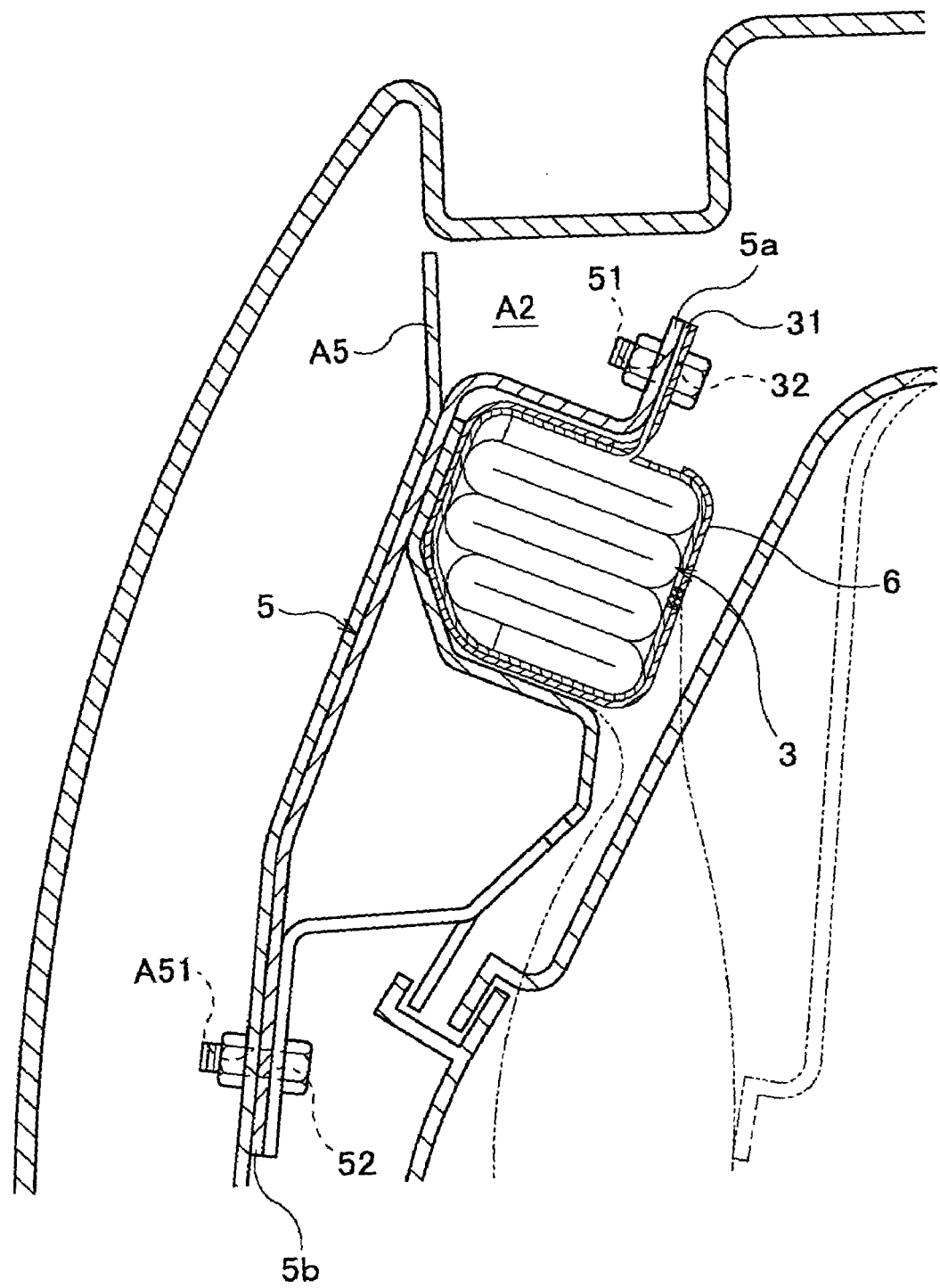
FIG. 3 is a drawing illustrating the airbag attached to a vehicle in a folded situation.

The airbag 3 to absorb and buffer the impact force added to a passenger in the side collision and roll over is inflated by gas being filled inside with the inflator 4, and thereby, as shown in FIG. 1, the airbag 3 is designed to inflate and unfurl like a curtain from an upside toward a downside of vehicle side window glasses in a vehicle compartment. The airbag 3 is a bag formed by seaming cloth made of nylon. As shown in FIGS. 2 and 3, a rectangular and tongue-like attachment piece 31 is protrusively formed along an upper brim of the airbag 3 at a predetermined distance. Attachment holes are drilled at an approximate center of each attachment piece.

The airbag 3 composed as such, as shown in FIG. 3, is designed to be attached to a vehicle pillar inner panel with a protecting cloth 6 wound through a bracket 5 which is an attachment member. In the bracket 5 to attach the airbag to the vehicle body, through-holes 51 and 52 are formed at both ends of the upside/downside.

As shown in FIG. 3, one main face of attachment piece 31 of the airbag 3 and that of an upper end 5a of the bracket 5 accord and another main face of lower end 5b of the bracket 5 are combined in an exposed situation below the folded airbag 3, whereby the airbag 3 and bracket 5 are unified with both being fastened with a bolt and nut through an attachment hole 32 formed in the attachment piece 31 and though-hole 51 at the upper end 5a of the bracket 5. Then, the unified airbag 3 and bracket 5 are attached to a vehicle pillar panel A5 by both being fastened with the bolt and nut through the through-hole 52 at the lower end 5b of the bracket 5 and a fix hole A51 of the vehicle pillar inner panel A5.

In the passenger protecting apparatus composed as such, as shown in FIG. 3, the airbag 3 is normally folded like a cornice approximately from an upside to downside direction and housed in a roof side rail A2 like a long scale.

In the passenger protecting apparatus composed as such, as shown in FIG. 3, the airbag 3 is normally folded like a cornice approximately from an upside to downside direction and housed in a roof side rail 2A like a long scale.

In the above situation, for example, if a vehicle is collided from one side of the vehicle by another vehicle, a collision detecting sensor detects the collision and the inflator 4 fills gas in the airbag 3. The airbag 3 filled with gas is designed to absorb and buffer an impact force added to a passenger's head by a cushion effect of the airbag 3 which is, as shown in FIG. 1, inflated and unfurled from the housed situation in the roof side rail A2 like a curtain from an upside of the side window glasses A3 toward downside in the vehicle compartment.

Then, work in attaching the airbag 3 to the vehicle pillar inner panel A5 composing the passenger protecting apparatus 1 is described.

Firstly, as shown in FIG. 4A, when fastening the airbag 3 to the pillar inner panel A5 with a bolt, accord one main face of attachment piece 31 of the airbag 3 wound with the protecting cloth 6 in a folded situation with one main face of one end 5a of the bracket 5 and combine so that one main face of the other end 5b of the bracket 5 is exposed to a downside of the folded airbag 3.

In this situation, as shown in FIG. 4B, unify the airbag 3 and bracket 5 by fastening them with a bolt and nut through the attachment hole 32 formed in the attachment piece 31 of the airbag 3 and the through-hole 51 of one end 5a of the bracket 5. Then, as shown in FIG. 4C, with the upper brim of the air bag 3 being positioned as facing upward to the vehicle, fasten the bracket 5 attached to the airbag 3 and the vehicle pillar inner panel A5 with a bolt and nut through the through-hole 52 of the other end 5b of the bracket 5 and the fix hole A51 of the pillar inner panel A5, and attach the bracket 5 to the pillar inner panel A5. Thus, the airbag 3 is attached to the pillar inner panel A5.

Thus, the structure, in which the attachment hole 52 to fasten/fix the bracket 5 to attach the airbag 3 to the pillar inner panel A5 is positioned at the downside of the folded airbag 3 when fastening the airbag 3 to the vehicle pillar inner panel A5 with a bolt, enables a bolt dropped from the fastening position to be avoided from entering in the gap between the airbag 3 and body, thereby reducing burdensome work taking out the dropped bolt in the gap between the airbag 3 and body and being able to prevent long time in a series of work to attach/fasten the airbag to the body from being needed.

Moreover, for a worker fastening the airbag 3 in a vehicle compartment, a working position becomes lower when fastening the airbag 3 to the vehicle, so an elevation angle in fastening the airbag 3 with a bolt can be smaller, and thereby a worker's burden can be reduced. Therefore, the passenger protecting apparatus 1 enables an efficiency of attaching work to the vehicle to be improved.

Meanwhile, a passenger protecting apparatus of the invention is not limited to the passenger protecting apparatus 1 and there exists no problem in changing as needed as far as requirements of the invention are not deviated. For example, the bracket 5 to attach the airbag 3 to the vehicle pillar inner panel A5 can be prevented from bending due to the weight of the airbag 3 if the bracket 5 is composed so as to have a rib, flange, and/or bead fanned along the upper end 5a to lower end 5b.

Moreover, a structure provided with a protruded portion at one end 5a as well as a fit-in hole formed to be able to fit in a protruded portion at the vehicle pillar inner panel A5 enables the bracket 5 to be firmly attached to the vehicle and, in addition, to be prevented from bending due to the weight of the airbag 3. Furthermore, a structure providing the bracket 5 with a temporary fixing clip of the airbag 3 supplied to the vehicle body becomes easy to be fastened and its strength is increased.

Figure 5:
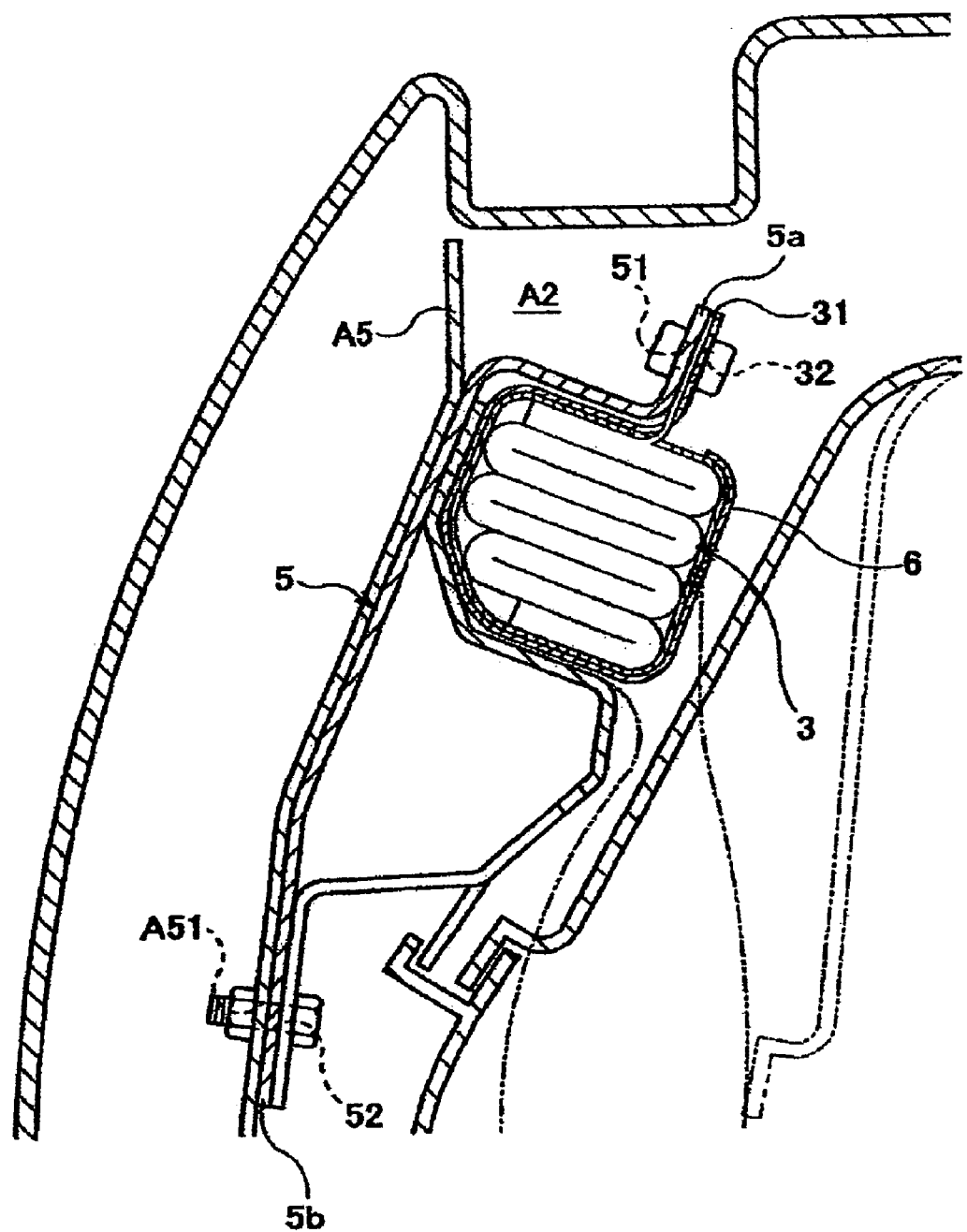
FIG. 5 is a drawing illustrating one embodiment of a rivet in accordance with the principles of the present invention.

In the embodiment, the airbag 3 and bracket 5 are unified with both being fastened with a bolt and nut through the attachment hole 32 drilled in the attachment piece 31 of the airbag 3 and through-hole 51 at one end 5a of the bracket 5. However, an attaching method of the bracket 5 to the airbag 3 is arbitrary and, for example as shown in FIG. 5, the airbag 3 and bracket 5 may also be unified by both being firmly fixed with a rivet through the attachment hole 32 of the airbag 3 and through-hole 51 at one end 5a of the bracket 5.

In the embodiment, a case is described, in which work procedures to attach the airbag 3 to the vehicle pillar inner panel A5 is to unity the airbag 3 and bracket 5 by attaching the former to the latter and then to attach the airbag 3 to the inner panel A5, thereby attaching the airbag 3 to the inner panel A5. However, unifying work of the airbag 3 and inner panel A5 is not always needed in attaching the airbag 3 to the vehicle, so they may also be unified in advance.

What is claimed is:

1. A passenger protecting apparatus comprising:
   an airbag provided above a door opening of a vehicle body in a folded situation and is inflated and unfurled downward in gas inflow to protect a passenger,
   said airbag being unified with a bracket through a through-hole formed at the bracket above the airbag; and
   wherein said bracket is fastened, fixed, and attached to said vehicle body by a fitting through only another through-hole formed below said airbag.

2. A passenger protecting apparatus according to claim 1, wherein a protrusion portion which can fit in a fit-in hole provided in said vehicle body is provided at one end of said bracket.

3. A method for attaching a passenger protecting apparatus comprising, providing a passenger protecting apparatus including an airbag which is provided above a door opening of a vehicle body in a folded situation and is inflated and unfurled downward in gas inflow to protect a passenger, said airbag being unified with a bracket through a through-hole formed at the bracket above the airbag; and said bracket is fastened, fixed, and attached to said vehicle body by a fitting through only another through-hole formed below said airbag, wherein after said airbag is attached to said bracket in advance, thereby making a subassembly, said subassembly is attached to said vehicle body.

4. A method for attaching a passenger protecting apparatus according to claim 3, wherein said subassembly is attached to said vehicle body with a bolt and nut.

5. A method for attaching a passenger protecting apparatus according to claim 3, wherein said subassembly is attached to said vehicle body with a rivet.

\* \* \* \* \*